(12) United States Patent
Chemistruck et al.

(10) Patent No.: US 12,327,320 B2
(45) Date of Patent: Jun. 10, 2025

(54) GEOMETRY-AWARE SPATIAL INTERPOLATION

(71) Applicant: Microsoft Technology Licensing, LLC, Redmond, WA (US)

(72) Inventors: Michael George Chemistruck, Issaquah, WA (US); Nikunj Raghuvanshi, Redmond, WA (US); John Michael Snyder, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 266 days.

(21) Appl. No.: 18/082,885

(22) Filed: Dec. 16, 2022

(65) Prior Publication Data

US 2024/0203062 A1 Jun. 20, 2024

(51) Int. Cl.
*G06T 19/00* (2011.01)
*G06T 7/70* (2017.01)
*G06T 15/20* (2011.01)

(52) U.S. Cl.
CPC .............. *G06T 19/006* (2013.01); *G06T 7/70* (2017.01); *G06T 15/20* (2013.01)

(58) Field of Classification Search
CPC .......... G06T 19/006; G06T 7/70; G06T 15/20
USPC ........................................................ 345/633
See application file for complete search history.

(56) References Cited

U.S. PATENT DOCUMENTS

| | | | | |
|---|---|---|---|---|
| 10,469,873 B2* | 11/2019 | Pang | .................... | H04N 13/117 |
| 10,737,185 B2* | 8/2020 | Fargo | ...................... | G06F 3/167 |
| 11,367,246 B2* | 6/2022 | Moloney | ................. | G01C 21/30 |
| 11,606,662 B2* | 3/2023 | Raghuvanshi | .......... | H04S 7/304 |
| 11,680,803 B2* | 6/2023 | Caulfield | ................ | G06T 19/00 |
| | | | | 345/424 |
| 11,965,743 B2* | 4/2024 | Moloney | ................. | G05D 1/246 |
| 2015/0057083 A1* | 2/2015 | Mehra | ...................... | A63F 13/54 |
| | | | | 463/35 |
| 2017/0244948 A1* | 8/2017 | Pang | ..................... | H04N 23/957 |
| 2018/0089903 A1* | 3/2018 | Pang | ....................... | H04N 23/45 |

(Continued)

OTHER PUBLICATIONS

Garcia, Mandy, "MPEG-I", Retrieved From: https://web.archive.org/web/20220703083943/https://www.iis.fraunhofer.de/en/ff/amm/for/mpegi.html, Jul. 3, 2022, 3 Pages.

(Continued)

*Primary Examiner* — Sheree N Brown
(74) *Attorney, Agent, or Firm* — Workman Nydegger

(57) ABSTRACT

A system for facilitating geometry-aware spatial interpolation is configured to access a data structure comprising a set of sample points (each sample point being associated with respective coordinates relative to a virtual environment) and determine a respective safety distance for association with at least some sample points of the set of sample points. Each respective safety distance represents a distance from its associated sample point to a nearest virtual object of the virtual environment. Each respective safety distance indicates a respective safety region for its associated sample point. Each respective safety region indicates a region within which its associated sample point is usable for generating interpolated data. The system is further configured to store each respective safety distance within the data structure in association with its associated sample point of the set of sample points.

20 Claims, 24 Drawing Sheets

(56) References Cited

U.S. PATENT DOCUMENTS

| | | | |
|---|---|---|---|
| 2019/0057531 A1* | 2/2019 | Sareen | A63F 13/211 |
| 2019/0149697 A1* | 5/2019 | Novikov | H04N 1/6025 |
| 2023/0044729 A1* | 2/2023 | Moloney | G06T 17/05 |
| 2023/0103091 A1* | 3/2023 | Held | G02B 27/0172 |
| | | | 345/630 |
| 2023/0360333 A1* | 11/2023 | Edwards | H04N 9/75 |

OTHER PUBLICATIONS

"Star domain", Retrieved From: https://en.wikipedia.org/wiki/Star_domain, Dec. 8, 2005, 3 Pages.

"What is Project Acoustics?", Retrieved From: https://aka.ms/acoustics, Jun. 12, 2022, 4 Pages.

* cited by examiner

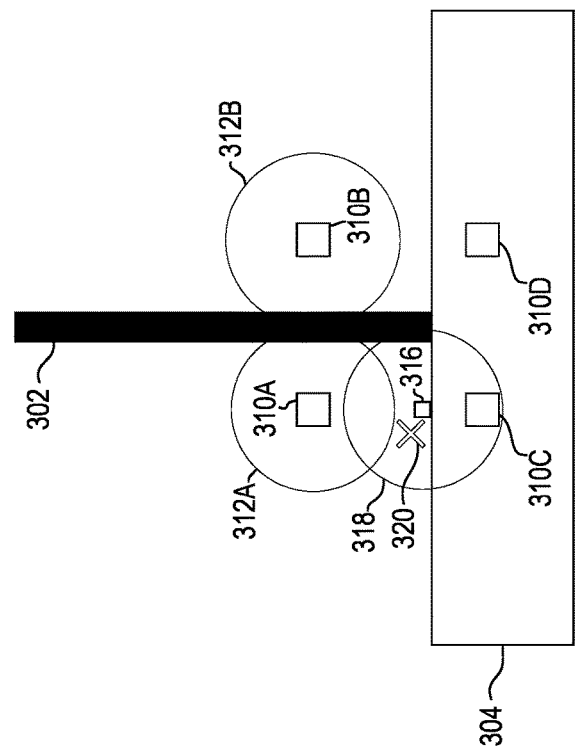

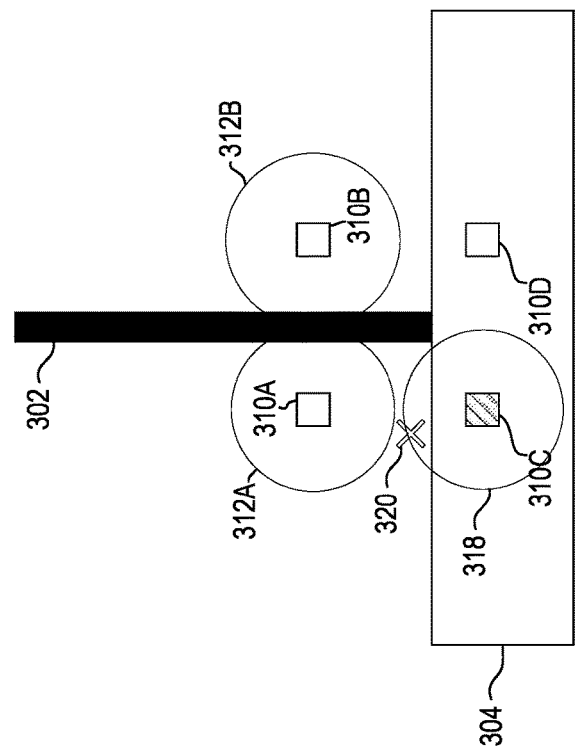

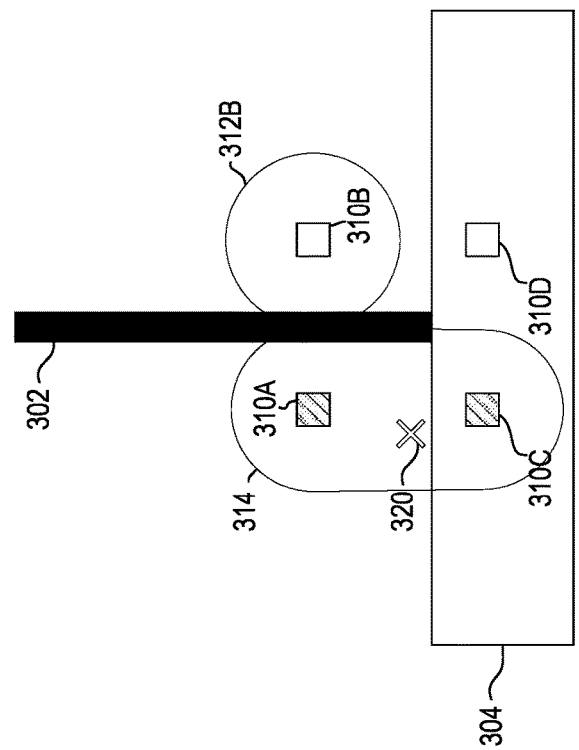

600

602 — Accessing A Data Structure Comprising A Set Of Sample Points, Wherein Each Sample Point Of The Set Of Sample Points Is Associated With Respective Coordinates Relative To A Virtual Environment, The Virtual Environment Comprising One Or More Virtual Objects

604 — Determining A Respective Safety Distance For Association With At Least Some Sample Points Of The Set Of Sample Points, Each Respective Safety Distance Representing A Distance From Its Associated Sample Point Of The Set Of Sample Points To A Nearest Virtual Object Of The Virtual Environment, Each Respective Safety Distance Indicating A Respective Safety Region For Its Associated Sample Point, Each Respective Safety Region Indicating A Region Within Which Its Associated Sample Point Is Usable For Generating Interpolated Data

606 — Storing Each Respective Safety Distance Within The Data Structure In Association With Its Associated Sample Point Of The Set Of Sample Points

608A — In Response To Detecting That Respective Coordinates Of A Particular Sample Point Of The Set Of Samples Indicate Positioning Of The Particular Sample Point Within A Virtual Object Of The Virtual Environment, (1) Determining Whether A Single Portion Of The Environment Exists That Is (i) Nearest To The Particular Sample Point And (ii) Not Contained By A Virtual Object; And (2) In Response To Determining That The Single Portion Of The Environment Exists: (i) Measuring A Safety Distance For The Single Portion Of The Environment, And (ii) Storing The Safety Distance Within The Data Structure In Association With The Particular Sample Point

608B — In Response To Detecting That Respective Coordinates Of A Particular Sample Point Of The Set Of Samples Indicate Positioning Of The Particular Sample Point Within A Virtual Object Of The Virtual Environment, (1) Determining Whether A Single Portion Of The Environment Exists That Is (i) Nearest To The Particular Sample Point And (ii) Not Contained By A Virtual Object; And (2) In Response To Determining That The Single Portion Of The Environment Exists: (i) Measuring A Safety Distance For The Particular Sample Point; And (ii) Storing The Safety Distance Within The Data Structure In Association With The Particular Sample Point. In Some Implementations, Act 608B Further Includes Storing Environment Data Associated With The Single Portion Of The Environment In Association With The Particular Sample Point

610 — Generating Interpolated Data Using The Data Structure. In Some Instances, Generating Interpolated Data Comprises (i) Determining Whether A Query Point Is Contained By One Or More Safety Regions Of The Data Structure; And (ii) In Response To Determining That The Query Point Is Contained By The One Or More Safety Regions, Utilizing One Or More Sample Points Associated With The One Or More Safety Regions To Generate Interpolated Data For The Query Point

*FIG. 6*

GEOMETRY-AWARE SPATIAL INTERPOLATION

BACKGROUND

Virtual environments are used for various purposes, such as experience sharing, gaming, creative endeavors, commercial interactions, and/or others. Many virtual environments attempt to emulate real-world physical systems, such as light propagation, sound propagation, object mechanics, magnetism, and/or others. Many virtual environments are intended for real-time or near real-time implementations.

To generate such virtual environments, systems often precompute three-dimensional environment data for use at runtime. In one example, acoustic data may be stored for all possible sound source and user position pairs within a virtual environment (other types of data that can be indexed by two positions may be used). The acoustic data can vary for different position pairs within the virtual environment. The stored acoustic data could be used to facilitate accurate audio effects during runtime (e.g., via lookup based upon user position and source position). However, storing this amount of data is impractical (e.g., often many gigabytes for a single scene within a virtual environment). To account for this, some systems sample the acoustic data and rely on interpolation at runtime. However, the coarser the sampling, the more difficult it is to facilitate accurate interpolation at runtime.

The subject matter claimed herein is not limited to embodiments that solve any disadvantages or that operate only in environments such as those described above. Rather, this background is only provided to illustrate one exemplary technology area where some embodiments described herein may be practiced.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which:

FIGS. 3A through 3F illustrate conceptual representations of determining a safety region for a sample point positioned within a virtual object of a virtual environment.

FIGS. 6 and 7 illustrate example flow diagrams depicting acts associated with facilitating geometry-aware spatial interpolation.

DETAILED DESCRIPTION

Figure 1:
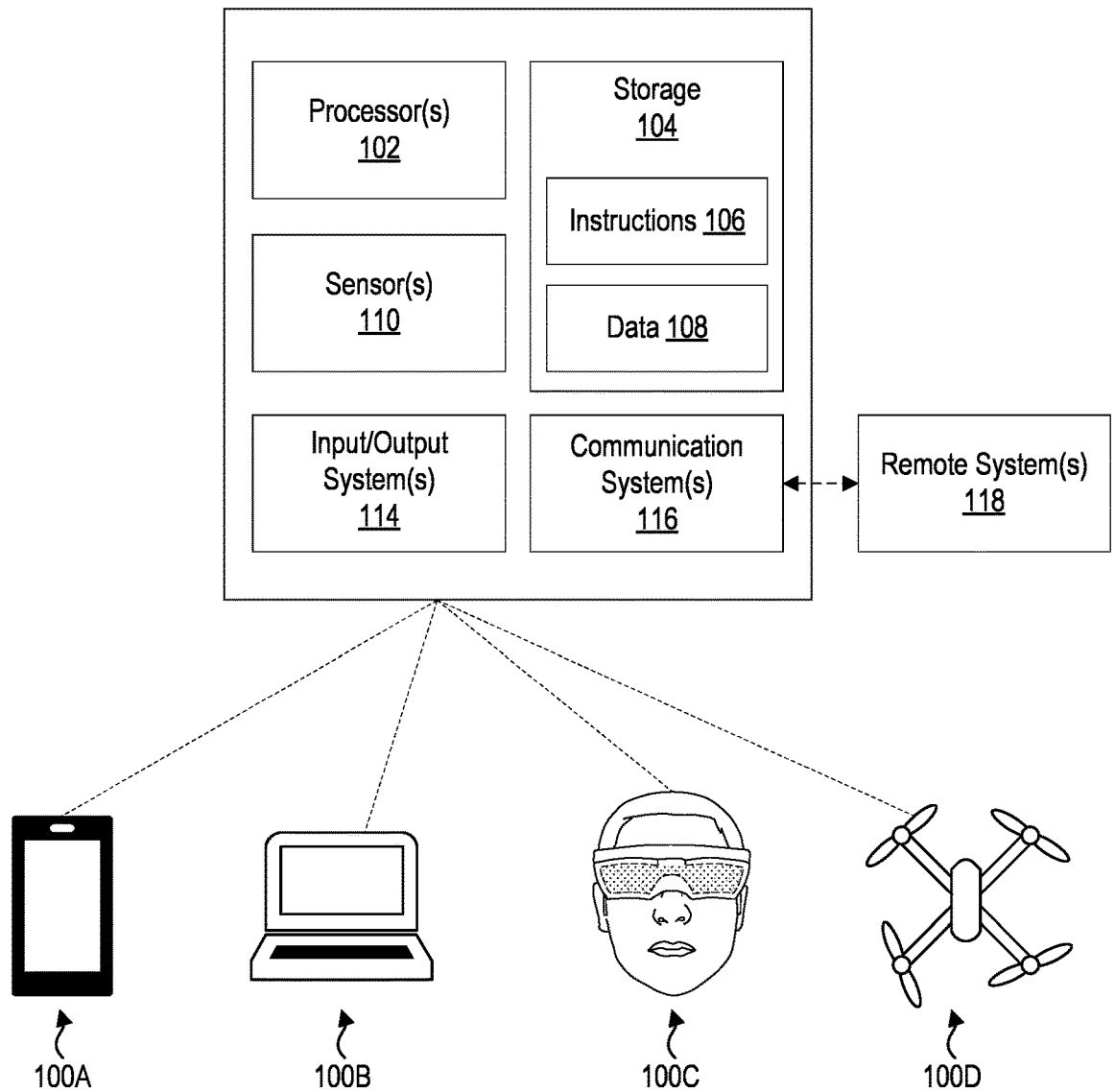
FIG. 1 illustrates example components of an example system that may include or be used to implement one or more disclosed embodiments.

Disclosed embodiments are generally directed to systems, methods, and apparatuses for facilitating geometry-aware spatial interpolation.

As noted above, it is typically undesirable to store a direct representation of the 3D geometry of a virtual environment for facilitating various aspects of a virtual experience within the virtual environment, such as sound propagation, light propagation, temperature/humidity change, etc. For example, using raw triangles to represent the geometry would require ray casts at run-time, which is too computationally intensive to be realistic for real-time applications. Storing a simplified voxel representation of the geometry is often not accurate enough at practical voxel thicknesses to produce accurate interpolation results at runtime.

Instead, many systems provide virtual environments by sampling environment data (e.g., acoustic data) and relying on interpolation at runtime. Although the sampling, if coarse enough, can make the amount of environment data manageable for runtime implementations, sparse sampling can give rise to challenges when interpolating at runtime. For instance, when interpolating on a sparse set of sample data, an interpolator can incorporate sample points that are on different sides of geometry/virtual objects in the virtual environment. As a specific example, sample points on opposite sides of a wall in a virtual environment might be used to generate a single interpolated value (e.g., interpolated acoustic parameters) at runtime. Such interpolated values can degrade user experiences, such as where users position themselves near a wall, and they are able to perceive sounds on the other side of the wall in an unrealistic manner due to an interpolator including sample points on the other side of the wall when generating interpolated acoustic data/parameters for the user's position.

At least some disclosed embodiments are directed to techniques for facilitating geometry-aware spatial interpolation. At least some disclosed embodiments may facilitate interpolation for uniform and non-uniform grids of data (e.g., sample points), handling geometry/virtual objects in the virtual environment differently for different grid types. For uniform grids, at least some disclosed embodiments store a number representing distance to closest geometry (referred to herein as "safety distance") for each sample point. This can be interpreted as a "safety region" (e.g., a safety sphere) around each sampled data point for which it is safe to use that sample during interpolation. In some instances, where domain-specific information about the data contained in each sampled point is available (e.g., environment data, such as acoustic data or others), the safety region can be expanded by combining the safety regions from neighboring sample points that contain similar data.

Sampling on a uniform grid can often produce sample points that are inside geometry and thus have invalid environment data. At least some disclosed techniques account for such sample points by incorporating environment data from a nearest neighboring data point that is not within scene geometry, thus potentially increasing the quantity of valid samples to interpolate with.

In some instances, non-uniform grids include fewer sampled points than corresponding uniform grids, enabling utilization of more data to account for scene geometry than a single safety distance as in the uniform grid case. At least some techniques for handling non-uniform grids create and store a safety region (e.g., a star-shaped region) describing the nearest geometry to a sample point along N-axes (any number of axes may be used, and the number may be selected/tuned based on desired disk-space utilization, accuracy, compute cost, etc.). For any query points that lie within a sample point's safety region, the sample point may be regarded as safe to use for interpolation. Safety regions of neighboring samples may be combined if the samples are contained in each other's safety regions.

In some instances, the safety distance and/or safety region-based interpolation techniques discussed herein can produce invalid values or otherwise fail, such as when interpolating near certain types of geometric boundaries and/or structures. In such cases, at least some disclosed embodiments enable utilization of alternative interpolation modes. Example alternative interpolation modes include a nearest neighbor interpolation mode, a geometry-unaware interpolation mode, a data-specific heuristics interpolation mode, or a push vector interpolation mode.

Utilizing data structures that include safety regions in association with sample points within a virtual environment (e.g., defined using safety distances for uniform sample point grids or volumes/axes extended from sample points for non-uniform sample point grids) to perform interpolation may facilitate fast interpolation that still respects a 3D scene's geometry on sparse datasets, making it more affordable to precompute various aspects of the scene and recreate smooth results at run-time. In one example, such functionality may enable rapid generation of interpolated acoustic parameters (e.g., for a sound source and a listener) at runtime in a manner that accounts for the geometry of the virtual environment.

Having just described some of the various high-level features and benefits associated with the disclosed embodiments, attention will now be directed to FIGS. 1 through 7 These Figures illustrate various conceptual representations, architectures, methods, and supporting illustrations related to the disclosed embodiments.

Example Systems and Components

FIG. 1 illustrates various example components of a system 100 that may be used to implement one or more disclosed embodiments. For example, FIG. 1 illustrates that a system 100 may include processor(s) 102, storage 104, sensor(s) 110, input/output system(s) 114 (I/O system(s) 114), and communication system(s) 116. Although FIG. 1 illustrates a system 100 as including particular components, one will appreciate, in view of the present disclosure, that a system 100 may comprise any number of additional or alternative components.

The processor(s) 102 may comprise one or more sets of electronic circuitries that include any number of logic units, registers, and/or control units to facilitate the execution of computer-readable instructions (e.g., instructions that form a computer program). Such computer-readable instructions may be stored within storage 104. The storage 104 may comprise physical system memory and may be volatile, non-volatile, or some combination thereof. Furthermore, storage 104 may comprise local storage, remote storage (e.g., accessible via communication system(s) 116 or otherwise), or some combination thereof. Additional details related to processors (e.g., processor(s) 102) and computer storage media (e.g., storage 104) will be provided hereinafter.

In some implementations, the processor(s) 102 may comprise or be configurable to execute any combination of software and/or hardware components that are operable to facilitate processing using machine learning models or other artificial intelligence-based structures/architectures. For example, processor(s) 102 may comprise and/or utilize hardware components or computer-executable instructions operable to carry out function blocks and/or processing layers configured in the form of, by way of non-limiting example, single-layer neural networks, feed forward neural networks, radial basis function networks, deep feed-forward networks, recurrent neural networks, long-short term memory (LSTM) networks, gated recurrent units, autoencoder neural networks, variational autoencoders, denoising autoencoders, sparse autoencoders, Markov chains, Hopfield neural networks, Boltzmann machine networks, restricted Boltzmann machine networks, deep belief networks, deep convolutional networks (or convolutional neural networks), deconvolutional neural networks, deep convolutional inverse graphics networks, generative adversarial networks, liquid state machines, extreme learning machines, echo state networks, deep residual networks, Kohonen networks, support vector machines, neural Turing machines, and/or others.

As will be described in more detail, the processor(s) 102 may be configured to execute instructions 106 stored within storage 104 to perform certain actions. The actions may rely at least in part on data 108 stored on storage 104 in a volatile or non-volatile manner.

In some instances, the actions may rely at least in part on communication system(s) 116 for receiving data from remote system(s) 118, which may include, for example, separate systems or computing devices, sensors, and/or others. The communications system(s) 116 may comprise any combination of software or hardware components that are operable to facilitate communication between on-system components/devices and/or with off-system components/devices. For example, the communications system(s) 116 may comprise ports, buses, or other physical connection apparatuses for communicating with other devices/components. Additionally, or alternatively, the communications system(s) 116 may comprise systems/components operable to communicate wirelessly with external systems and/or devices through any suitable communication channel(s), such as, by way of non-limiting example, Bluetooth, ultra-wideband, WLAN, infrared communication, and/or others.

FIG. 1 illustrates that a system 100 may comprise or be in communication with sensor(s) 110. Sensor(s) 110 may comprise any device for capturing or measuring data representative of perceivable or detectable phenomenon. By way of non-limiting example, the sensor(s) 110 may comprise one or more image sensors, microphones, thermometers, barometers, magnetometers, accelerometers, gyroscopes, and/or others.

Furthermore, FIG. 1 illustrates that a system 100 may comprise or be in communication with I/O system(s) 114. I/O system(s) 114 may include any type of input or output device such as, by way of non-limiting example, a touch screen, a mouse, a keyboard, a controller, and/or others, without limitation. For example, the I/O system(s) 114 may include a display system that may comprise any number of display panels, optics, laser scanning display assemblies, and/or other components.

FIG. 1 conceptually represents that the components of the system 100 may comprise or utilize various types of devices, such as mobile electronic device 100A (e.g., a smartphone), personal computing device 100B (e.g., a laptop), a mixed-reality head-mounted display 100C (HMD 100C), an aerial vehicle 100D (e.g., a drone), and/or other devices. A system 100 may take on other forms in accordance with the present disclosure.

Geometry-Aware Spatial Interpolation

Figure 2A:
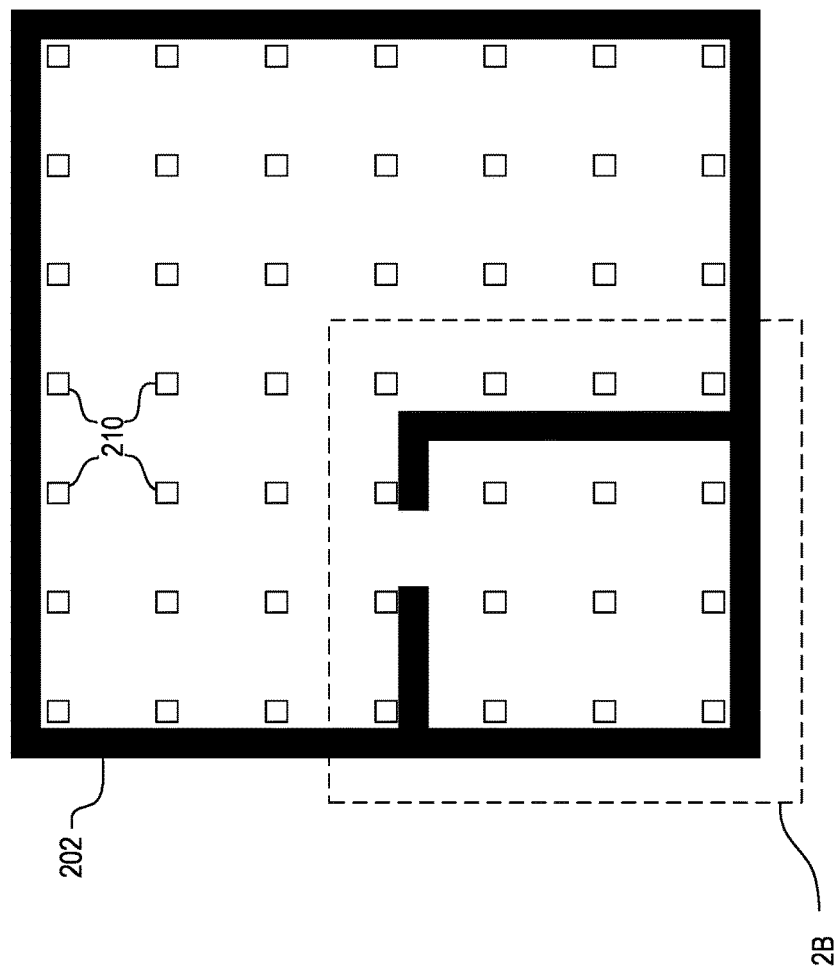
FIG. 2A illustrates a conceptual representation of an example virtual environment and a uniform grid of sample points associated with the virtual environment.

FIG. 2A depicts an example virtual environment 200 and a grid of sample points 210 associated with the virtual environment 200. The virtual environment 200 includes various virtual objects, such as walls 202. A virtual environment 200 may comprise any type(s) and/or quantities of virtual objects (e.g., structural components/features within the virtual environment 200, such as walls, floors, ceilings, etc., and/or movable objects). Although FIG. 2A illustrates a two-dimensional top-down view of the virtual environment 200, one will appreciate that the principles discussed herein may be used in three-dimensional environments and/or sets of sample points.

In the example of FIG. 2A, the sample points 210 are organized in a uniform grid (e.g., a three-dimensional grid) with the sample points 210 uniformly distributed throughout the virtual environment 200. The sample points 210 may be part of a data structure stored in any suitable manner in association with the virtual environment 200. Each of the sample points 210 may store respective environment data for the virtual environment 200. For instance, each sample point may store acoustic data, temperature data, air pressure data, light propagation data, and/or others. In some implementations, the environment data for each of the sample points 210 is sampled from a full set of environment data for the virtual environment 200. As noted above, the full set of environment data for a virtual environment 200 may be impractical to use for facilitating real-time user experiences. The sample points 210, in combination with interpolation techniques, may instead be used.

Each of the sample points 210 is associated with respective coordinates within the virtual environment 200 (e.g., positional coordinates, such as x, y, z coordinates in 3D space). A system may therefore determine the positioning of each of the sample points 210 relative to geometry (e.g., virtual objects) within the virtual environment 200.

Figure 2B:
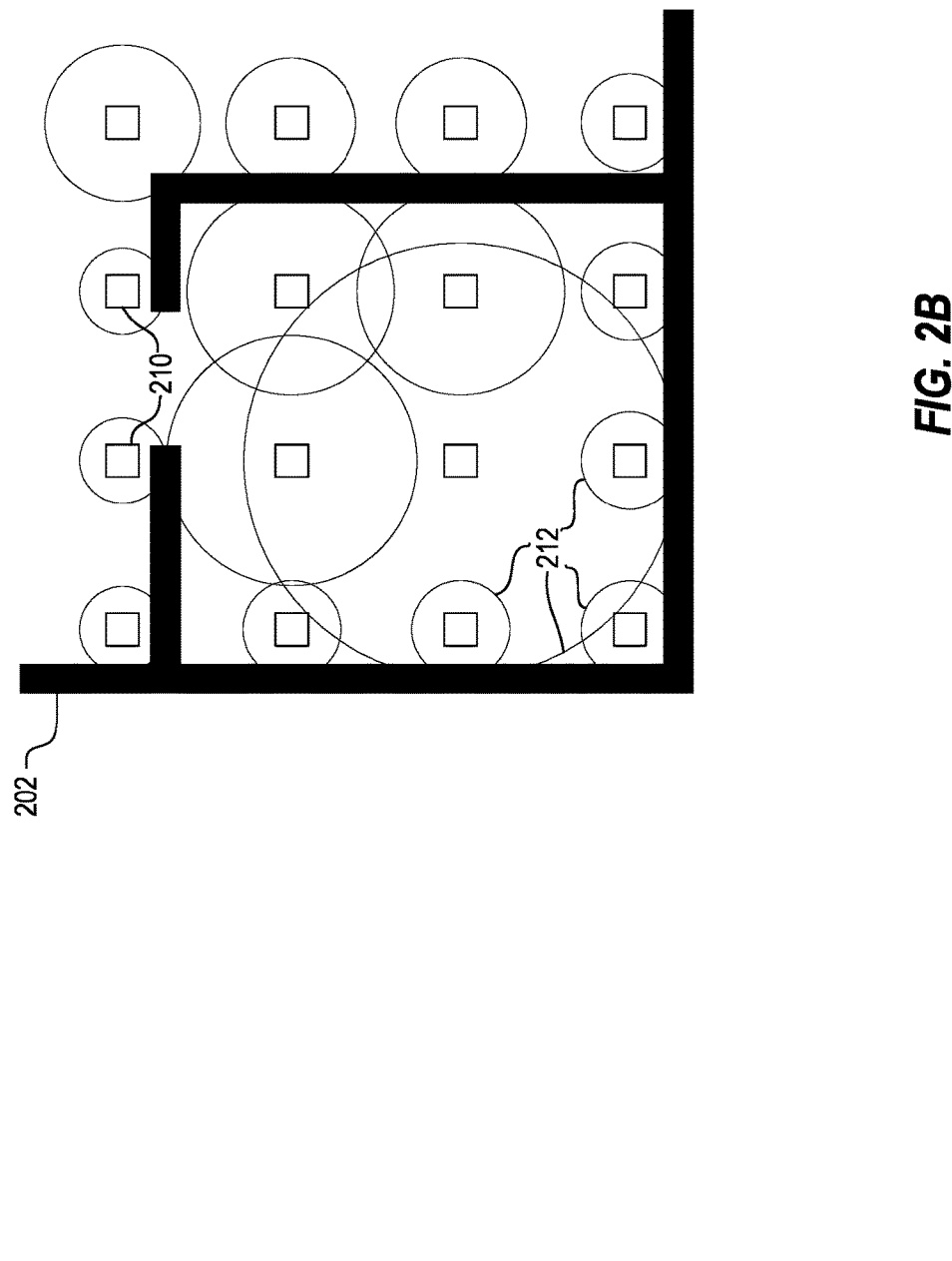
FIG. 2B illustrates a conceptual representation of example safety regions defined based upon safety distances for sample points associated with the virtual environment.

FIG. 2B depicts a portion of the virtual environment 200 (i.e., the portion labeled "2B" in FIG. 2A) and sample points 210 associated therewith. FIG. 2B illustrates respective safety regions 212 for each of the sample points 210, with the safety regions 212 being represented as circles centered on each of the sample points 210 (other shapes aside from circles are within the scope of the present disclosure, and, in 3D environments, the safety regions may comprise 3D shapes such as spheres and/or others). Each safety region 212 extends from its corresponding sample point 210 to a nearest geometry or nearest virtual object in the virtual environment 200. For instance, in the example of FIG. 2B, each safety region 212 extends from its corresponding sample point 210 until the safety region 212 reaches the nearest portion of the walls 202. In this regard, each safety region 212 may be characterized by a respective safety distance that represents the distance from its corresponding sample point 210 to the nearest virtual object (e.g., nearest virtual structural component) within the virtual environment 200. Each respective safety distance may define the radius and or other geometric characteristic(s) of each safety region 212.

The nearest virtual object to that a safety distance extends to from its associated sample point 210 may be selected in various ways. In some instances, the nearest virtual object to a sample point 210 is one that intervenes between the sample point 210 and a nearest portion of the virtual environment 200 that is (i) isolated from the sample point 210 (e.g., not reachable without object intersection by a ray extended from the sample point 210) and (ii) not contained by a virtual object in the virtual environment (e.g., a virtual air cell, or other cell that is in the same medium as the sample point 210).

In the example of FIG. 2B, each safety distance (and corresponding safety region 212) extends from its respective sample point 210 toward a midpoint within the volume of the nearest virtual object (e.g., halfway through the nearest portion of the walls 202 of the virtual environment 200). The midpoint may be selected along an axis extending from the sample point 210 and through the nearest virtual object. A safety distance may extend to other components of a nearest virtual object in accordance with the principles discussed herein (e.g., to a nearest boundary of the virtual object, to the furthest boundary of the virtual object, etc.).

Each safety distance may be stored within the data structure that includes its associated sample point 210 (e.g., in combination with the environment data stored for the associated sample point 210). In some implementations, the safety distances can advantageously provide a representation of the geometry of the virtual environment 200 while only adding a single value to each of the sample points 210.

The safety regions 212 discussed above may be utilized at runtime to facilitate generation of interpolated values (e.g., interpolated environment data) for various use cases. For instance, where each of the sample points 210 is associated with acoustic data, interpolated acoustic data for query points within the virtual environment 200 may be generated using the sample points 210. The safety regions 212 for the sample points 210 may indicate which particular sample points 210 to use to generate interpolated acoustic data for particular query points. Put differently, each respective safety region 212 may indicate a region within which its associated sample point 210 is usable for generating interpolated data.

Figure 2C:
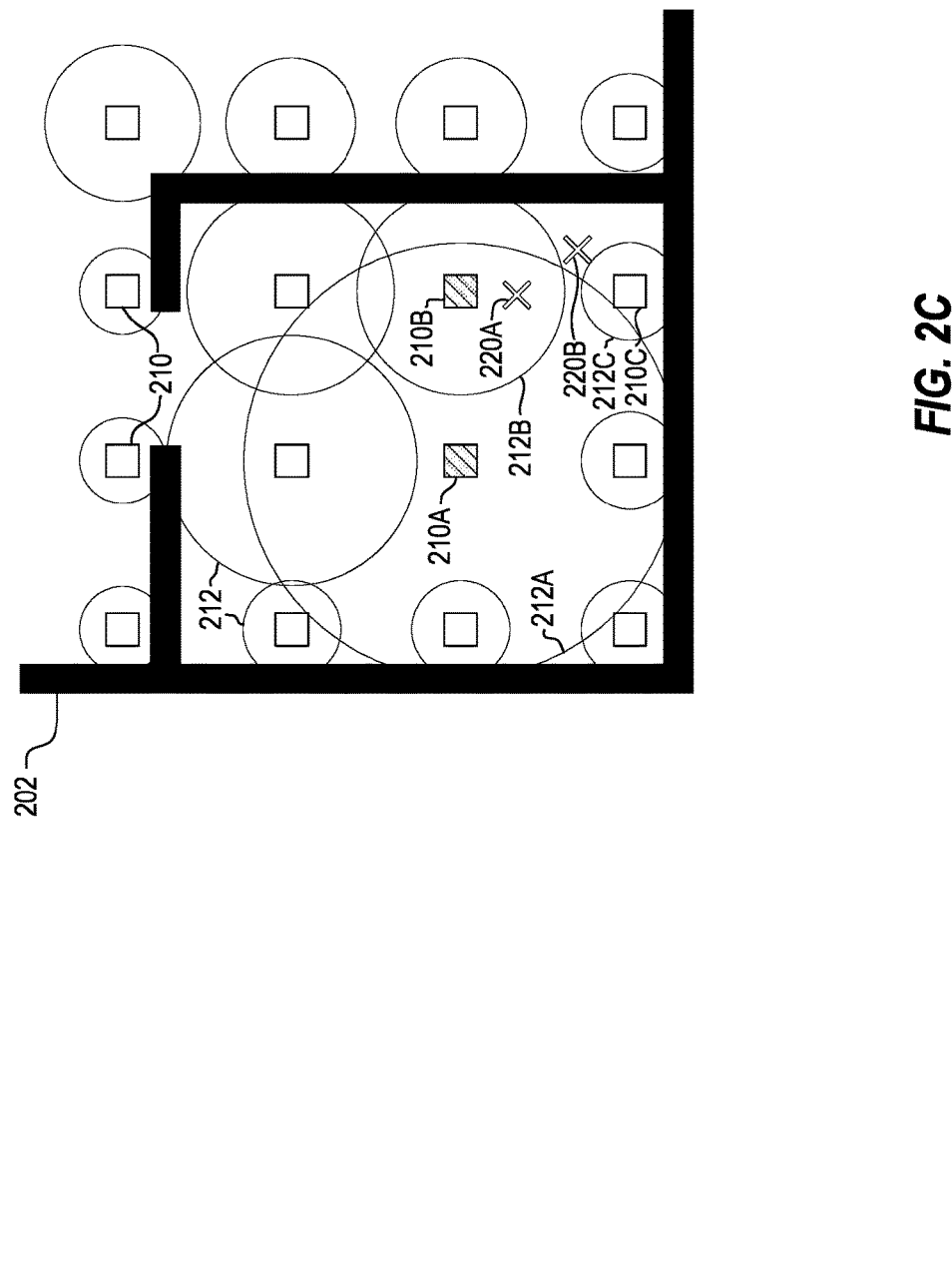
FIG. 2C illustrates a conceptual representation of query points within the virtual environment for which one or more sample points associated with the virtual environment are usable to generate interpolated data.

FIG. 2C illustrates a conceptual representation of query points 220A and 220B within the virtual environment 200. Like the sample points 210, each of the query points 220A and 220B is associated with respective positional coordinates within the virtual environment 200. As noted above, interpolated data may be generated for the query points 220A and 220B using one or more of the sample points 210 associated with the virtual environment 200.

By way of illustrative example, to generate interpolated data for query point 220A, a system may determine whether the query point 220A is contained by any safety regions 212 of sample points 210 associated with the virtual environment 200. For instance, a system may test the query point 220A against the safety regions 212 of sample points 210 with coordinates that are near the coordinates of the query point 220A to determine whether the query point 220A is positioned within the safety regions. FIG. 2C illustrates the query point 220A as being contained by the safety region 212A associated with sample point 210A and by the safety region 212B associated with sample point 210B.

In response to determining that the query point 220A is contained by one or more safety regions 212, the system may utilize the sample points 210 associated with the safety regions 212 that contain the query point 220A to generate interpolated data for the query point 220A. In the example of FIG. 2C, sample points 210A and 210B may be utilized to generate interpolated data for the query point 220A (e.g., via distance-based or distance weighted interpolation, or other techniques) since the safety regions 212A and 212B of the sample points 210A and 210B, respectively, contain the query point 220A (sample points 210A and 210B are marked with a pattern fill to indicate their usability for generating interpolated data for the query point 220A). Importantly, the implementation of safety regions can prevent sample points that are separated from query points by virtual objects/geometry from being used to generate interpolated data for such query points.

In some instances, there may exist portions of a virtual environment that are not contained by safety regions, which can lead to problems when attempting to generate interpolated data for query points within such portions of the virtual environment. In FIG. 2C, query point 220B is not contained by any safety regions 212, but it is nearly contained by safety regions 212B and 212C of sample points 210B and 210C, respectively. In some implementations, systems can mitigate the amount of space in a virtual environment not contained by a safety region by generating modified safety regions that combine adjacent safety regions and encompass space that intervenes between the adjacent safety regions. Safety region combination may be performed as part of pre-computation for building the data structure that stores the sample points (and their respective environment data and safety distances/regions) and/or as part of interpolation at runtime.

To combine adjacent safety regions 212 to provide modified safety regions, a system may identify adjacent safety regions 212 within a data structure (e.g., which may be identified based on their proximity to a particular query point) and determine whether the adjacent safety regions 212 are associated with similar environment data (e.g., by determining whether environment data for the adjacent safety regions satisfies one or more similarity thresholds). If the adjacent safety regions 212 contain similar environment data, the system may combine the adjacent safety regions 212 to define a modified safety region that includes the adjacent safety regions 212 and space that intervenes between the adjacent safety regions 212.

Figure 2D:
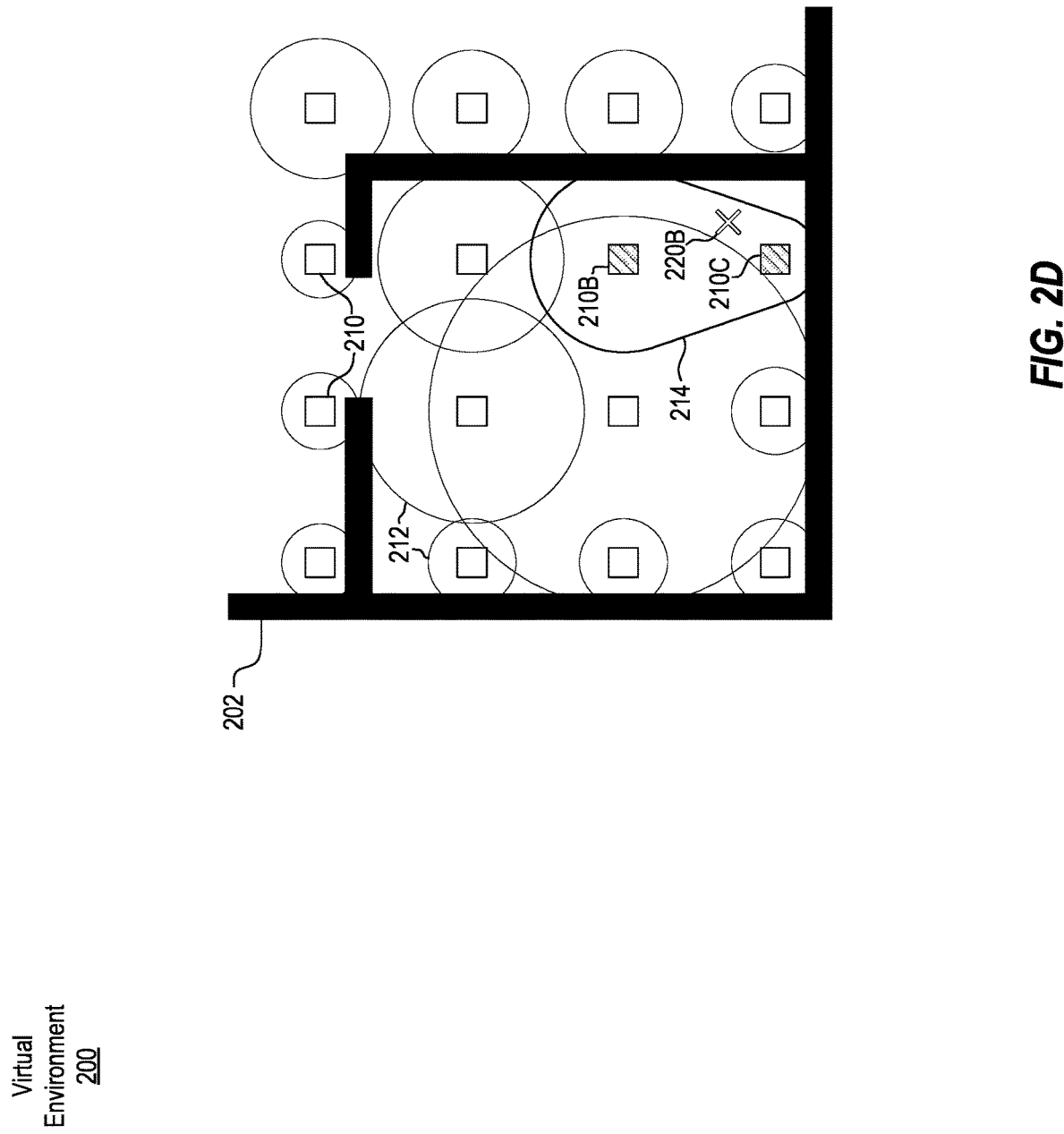
FIG. 2D illustrates a conceptual example of combining safety regions of adjacent sample points to determine a set of sample points usable to generate interpolated data for a query point.

By way of illustrative example, FIG. 2D illustrates a modified safety region 214, which is formed from the adjacent safety regions 212B and 212C (see FIG. 2C) of sample points 210B and 210C, respectively. The modified safety region 214 encompasses space between the adjacent safety regions 212B and 212C, thereby containing the query point 220B that was uncontained by any single safety region 212.

To generate interpolated data for the query point 220B, the system may determine whether the query point 220B is contained by any modified safety region (e.g., modified safety region 214). Upon determining that the query point 220B is contained by the modified safety region 214, the system may utilize the environment data of the adjacent sample points 210B and 210C that were used to obtain the modified safety region 214 to generate interpolated data for the query point 220B (e.g., via distance-based interpolation, or other techniques).

Figure 2E:
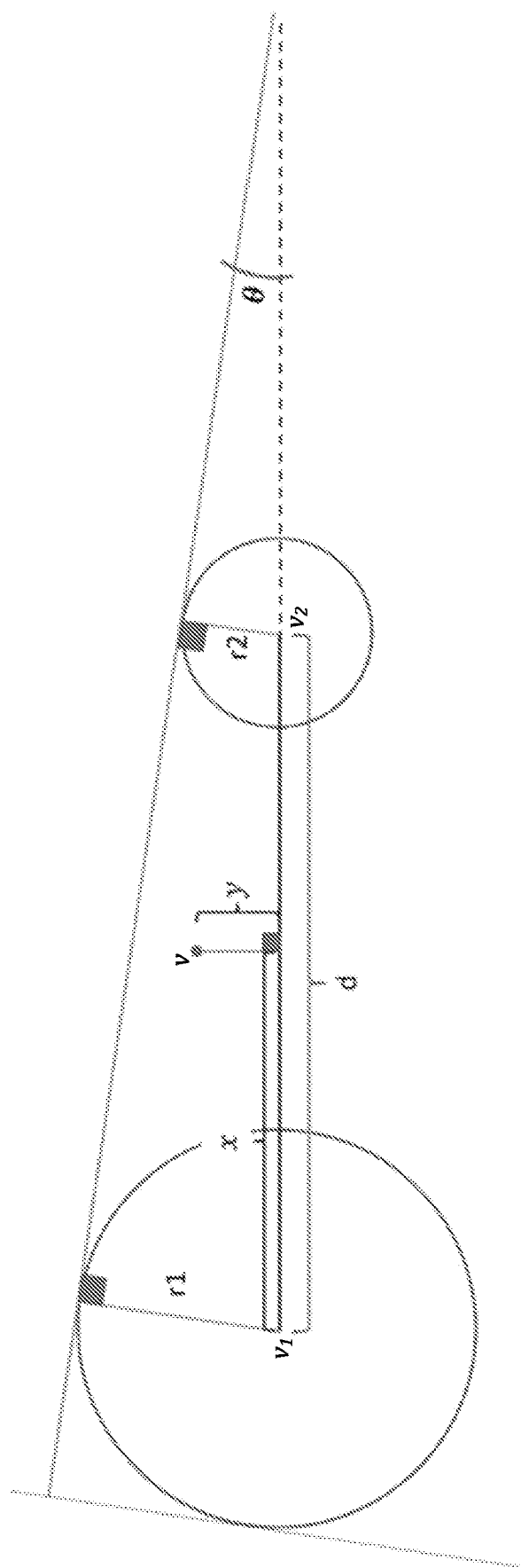
FIG. 2E provides an example diagram depicting variables for determining whether a query point is contained by a modified safety region formed from two adjacent safety regions.

A modified safety region may be obtained in various ways. FIG. 2E provides an example diagram depicting variables of the equations below for determining whether a query point, v, is contained by a modified safety region formed from two adjacent safety regions.

$$d = |v_2 - v_1|$$
$$\hat{d} = \frac{v_2 - v_1}{d}$$
$$x = (v - v_1) \cdot \hat{d}$$
$$y = \sqrt{|v - v_1|^2 - x^2}$$

To test if point is inside truncated cone formed by spheres:

$$0 \le x \le d \ \&\& \ y\sqrt{d^2 - (r_1 - r_2)^2} \le (d - x)r_1 + xr_2$$

Derivation:

$$\cos\theta = \sqrt{1 - \frac{(r_1 - r_2)^2}{d^2}},$$

And using similar triangles, $$y\cos\theta \le \left(1 - \frac{x}{d}\right)r_1 + \frac{x}{d}r_2$$

As noted above, a system may refrain from using adjacent safety regions to obtain a modified safety regions when environment data of the adjacent safety regions is dissimilar. For instance, acoustic data for adjacent sample points that are positioned on opposite sides of a wall are unlikely to be similar. Thus, by pre-checking similarity of underlying environment data of adjacent sample points, a system may avoid combining safety regions in a manner that would cause sample points that are separated by scene geometry/virtual objects to be used to generate interpolated data for a single query point.

Figure 3A:
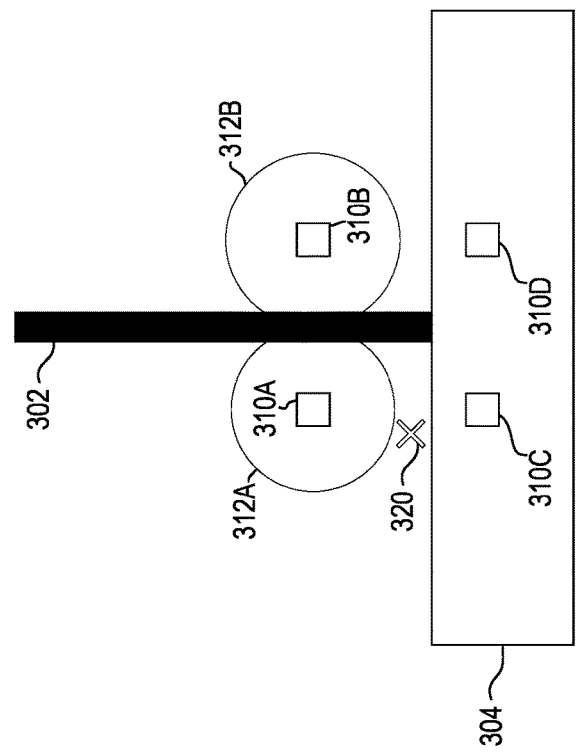

In some instances, one or more sample points of a data structure associated with a virtual environment may be positioned within geometry of the virtual environment (e.g., within one or more virtual objects and/or structural features of the virtual environment). FIG. 3A illustrates a side view of an example virtual environment 300 in which sample points 310A and 310B are positioned at coordinates in air above the floor 304 and on opposite sides of a wall 302, and in which sample points 310C and 310D are positioned within the floor 304 of the virtual environment 300. In some instances, the sample points 310C and 310D that are positioned within the floor 304 omit environment data or contain invalid environment data that is unusable for generating interpolated data at runtime.

FIG. 3A also illustrates a query point 320 that does not lie within any safety region. For instance, query point 320 is positioned below safety region 312A of sample point 310A. If sample point 310C had a safety region and usable environment data, a modified safety region may be constructed using the safety regions of both sample points 310A and 310C that encompasses the query point 320, thereby enabling interpolated data to be generated for the query point 320 using the sample points 310A and 310C. In some instances, for sample points that are positioned within scene geometry, a system incorporates environment data from other nearby portions of the environment to make such sample points usable for generating interpolated data at runtime. Such operations may be performed as pre-computation to build the data structure of sample points for use in generating interpolated data at runtime.

In some instances, to assign environment data and a safety region to a sample point contained by scene geometry, a system determines whether a single portion of the environment exists that is (i) nearest to the particular sample point and (ii) not contained by a virtual object (thereby including usable environment data). For instance, to assign environment data and a safety region to sample point 310C that is positioned within the floor 304 of the virtual environment 300, FIG. 3B illustrates a nearest portion 316 of the environment 300 that is not contained by any virtual object of the virtual environment 300 (or that includes usable environment data). In response to detecting the existence of the nearest portion 316, a system may define a safety distance and safety region 318 for the nearest portion 316, as illustrated in FIG. 3B. The safety distance and/or region 318 defined for the nearest portion 316 may then be assigned (or stored in association with) the sample point 310C, as depicted in FIG. 3C with the safety region 318 centered on the sample point 310C. In addition to the safety region 318 computed for the nearest portion 316, the environment data associated with the nearest portion 316 may be associated with the sample point 310C positioned within geometry of the virtual environment 300.

In the example of FIG. 3C, the safety region 318 associated with the sample point 310C contains the query point 320, making the environment data associated with the sample point 310C usable to generate interpolated data for the query point 320 at runtime. Utilizing the techniques for generating modified safety regions as discussed hereinabove with reference to FIGS. 2D and 2E, the safety region 318 of sample point 310C may be combined with the safety region 312A of sample point 310A to provide a modified safety region 314 (see FIG. 3D) that covers space between the safety regions 318 and 312A. FIG. 3D indicates that both sample points 310A and 310C may be utilized to generate interpolated data for the query point 320 (e.g., via the pattern fill in the sample points 310A and 310C).

Figure 3E:
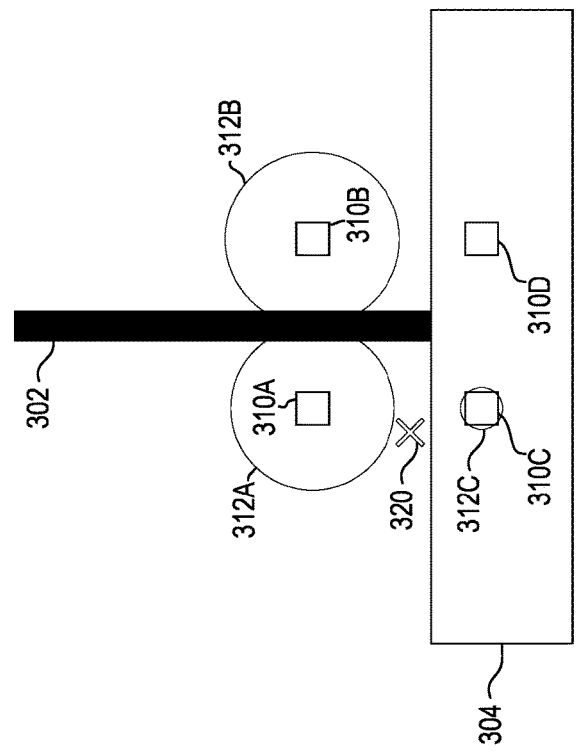
Figure 3F:
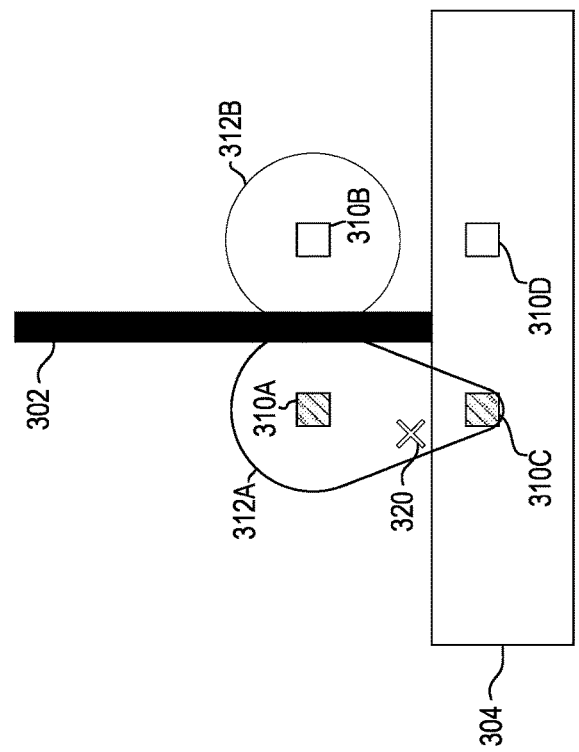

In some instances, rather than determining a safety distance and/or safety region 318 for the nearest portion 316 (see FIG. 3B) to associate with the sample point 310C (positioned within scene geometry, and for which a single nearest portion of the environment that includes usable environment data exists), a system determines a safety distance and/or safety region 312C directly for the sample point 310C, as shown in FIG. 3E. The safety distance and the environment data for the nearest portion 316 (see FIG. 3B) may be stored in association with the sample point 310C. Similar to FIG. 3D, the safety region 312C may be combined with a safety region 312A for an adjacent sample point 310A (provided the adjacent sample point 310A has sufficiently similar environment data) to provide a modified safety region 324 (see FIG. 3F). FIG. 3F indicates that both sample points 310A and 310C may be utilized to generate interpolated data for the query point 320 (e.g., via the pattern fill in the sample points 310A and 310C).

Figure 4A:
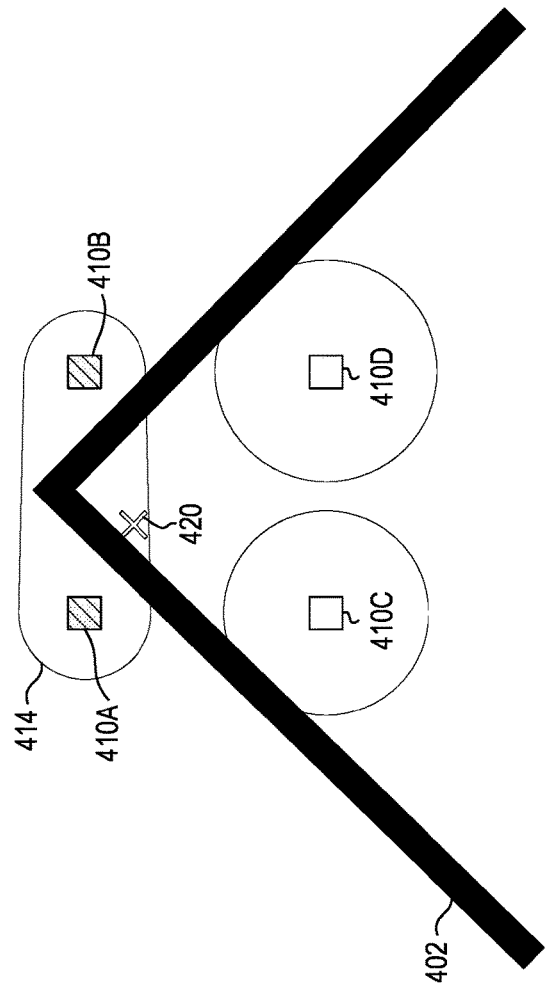
FIGS. 4A through 4E illustrate conceptual representations of example alternative interpolation modes that do not utilize safety regions.

It is possible that combining safety distances as discussed hereinabove with reference to FIGS. 2D, 2E, 3D, 3F can result in samples on an opposite side of scene geometry being used to generate interpolated data for a query point. For instance, FIG. 4A illustrates a query point 420 positioned near a corner of a wall 402 within a virtual environment 400. The query point 420 is positioned within a combined safety region 414 associated with sample points 410A and 410B. Sample points 410A and 410B, however, are on an opposite side of the wall 402 relative to the query point 420, which could result in interpolated data generated for the query point 420 using the environment data for the sample points 410A and 410B being unrealistic. To account for such situations (e.g., for query points positioned near corners within a virtual environment), a system may implement alternative interpolation modes instead of relying on a safety region based approach. FIGS. 4B through 4E depict conceptual representations of such alternative interpolation modes, including a nearest neighbor interpolation mode (FIG. 4B), a geometry-unaware interpolation mode (FIG. 4C), a data-specific heuristic interpolation mode (FIG. 4D), and a push vector interpolation mode (FIG. 4E).

Figure 4B:
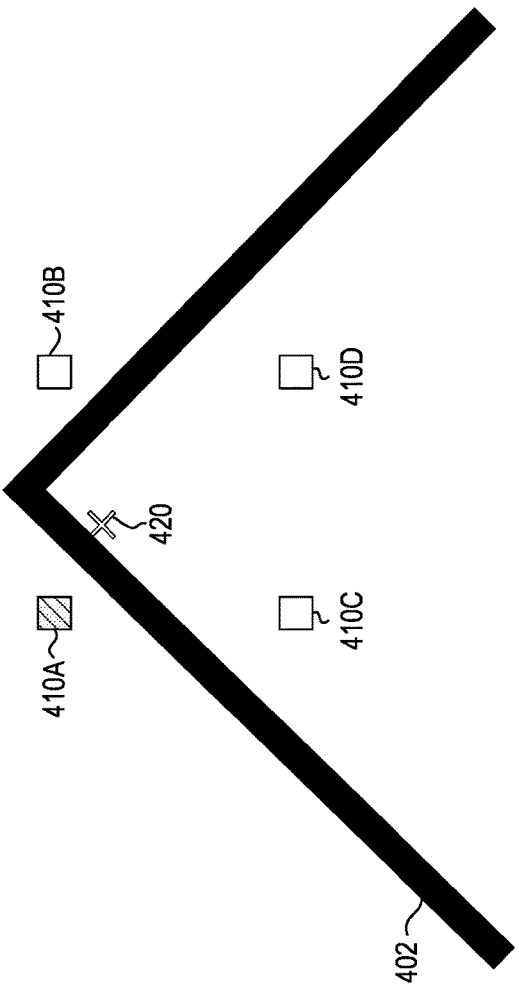

In the nearest neighbor interpolation mode of FIG. 4B, the sample point with coordinates that are nearest to the coordinates of the query point 420 (i.e., sample point 410A) is used to generate interpolated data for the query point 420. In some instances, one or more additional sample points that are proximate to the selected nearest neighbor sample point 410A are used in combination with the selected nearest neighbor sample point 410A to generate interpolated data for the query point 420 (e.g., provided that the proximate sample point(s) have environment data similar to the selected nearest neighbor sample point 410A).

Figure 4C:
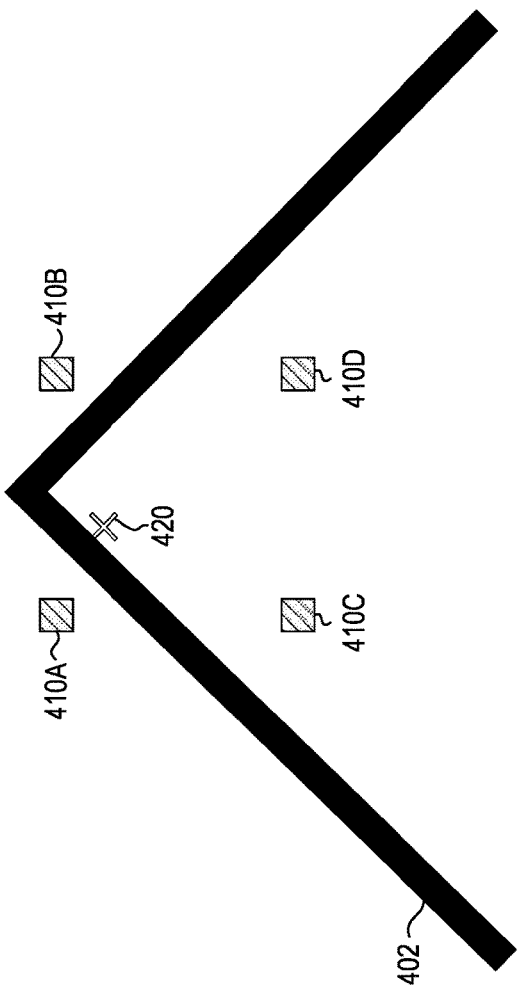

In the geometry-unaware interpolation mode of FIG. 4C, the set of sample points with coordinates that are nearest to the coordinates of the query point 420 (i.e., sample points 410A, 410B, 410C, and 410D) are used to generate interpolated data for the query point 420.

Figure 4D:
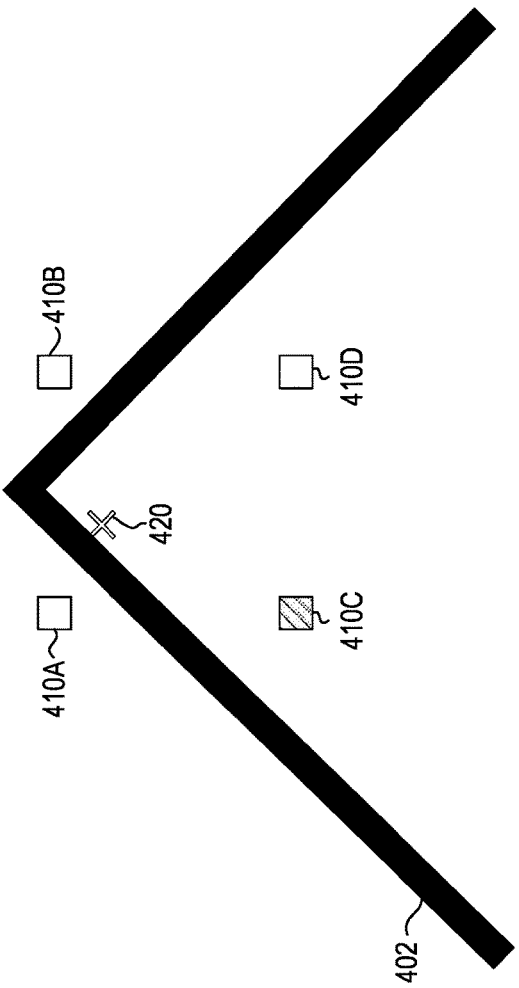
Figure 4E:
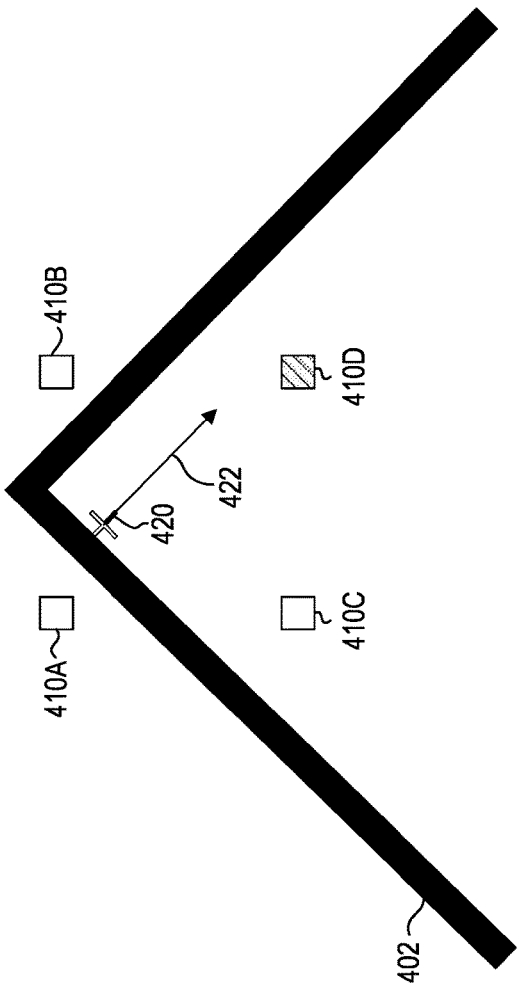

In the data-specific heuristic interpolation mode of FIG. 4D, the neighboring sample point(s) that include environment data that satisfy one or more conditions is/are selected generate interpolated data for the query point 420. For example, in the example of acoustic data, the neighboring sample point that includes the loudest acoustic parameters (i.e., sample point 410C) is selected for generating interpolated acoustic data for the query point 420. Other types of data-specific conditions and/or policies are within the scope of the present disclosure. In some instances, one or more additional sample points that are proximate to the sample point selected based upon data-specific heuristics are used in combination with the selected sample point 410C to generate interpolated data for the query point 420 (e.g., provided that the proximate sample point(s) have environment data similar to the selected sample point 410C).

In the push vector interpolation mode of FIG. 4E, a push vector 422 (e.g., a unit vector) is extended from the query point 420, and a nearest sample point to the query point 420 that the push vector 422 points toward is selected to generate interpolated data for the query point 420 (i.e., sample point 410D). The push vector 422 may take on various forms, such as a vector oriented toward a center of a space (e.g., a room) within the virtual environment 400, a vector with a direction of a normal vector associated with a nearest virtual object (e.g., a nearest portion of the wall 402) within the virtual environment 400, etc. In some instances, one or more additional sample points that are proximate to the sample point selected based upon the push vector are used in combination with the selected sample point 410D to generate interpolated data for the query point 420 (e.g., provided that the proximate sample point(s) have environment data similar to the selected sample point 410D).

Figure 5A:
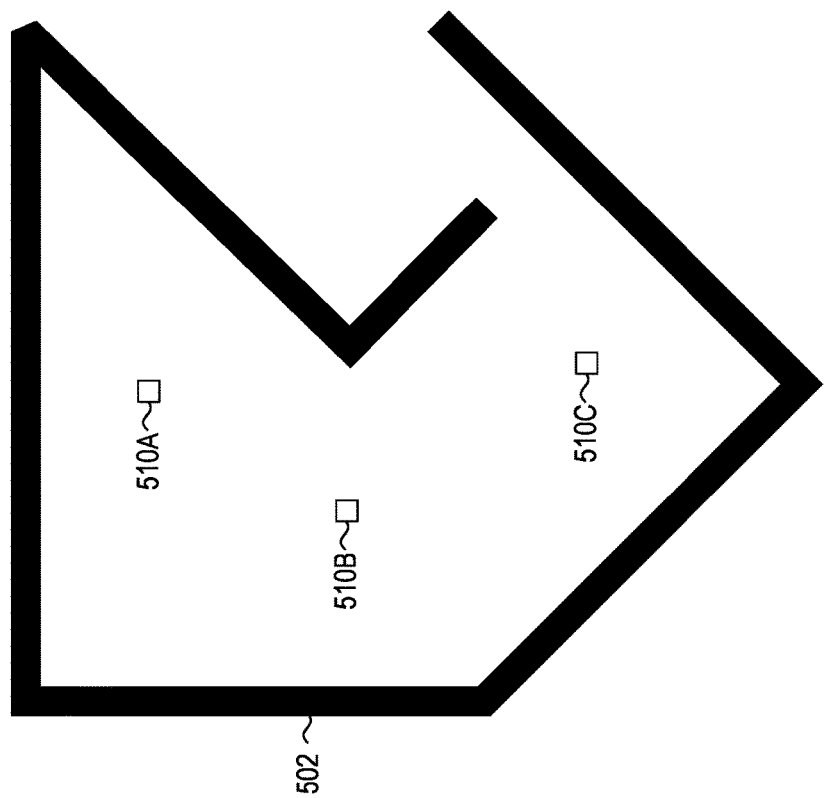
FIG. 5A illustrates a conceptual representation of an example virtual environment and a non-uniform grid of sample points associated with the virtual environment.

Many of the foregoing examples have focused, in at least some respects, on interpolation techniques for use on uniform grids of sample points. At least some techniques of the present disclosure may be utilized on non-uniform grids of sample points. FIG. 5A illustrates a top-down view of an example virtual environment 500 that includes walls 502. FIG. 5A also illustrates sample points 510A, 510B, 510C associated with the virtual environment 500. Similar to other sample points discussed herein, the sample points 510A, 510B, 510C associated with the virtual environment include respective coordinates indicating their positioning with respect to the virtual environment 500 and virtual objects thereof.

As is evident from FIG. 5A, the sample points 510A, 510B, 510C are non-uniformly distributed throughout the virtual environment 500. In some implementations, each sample point 510A, 510B, 510C stores or is associated with environment data (or a data structure including environment data). For instance, in the example of acoustic data, each sample point 510A, 510B, 510C (e.g., representing potential listener positions within the virtual environment 500) may store a respective data structure of sample points including acoustic data for an environment (e.g., in the form of a uniform grid of sample points representing potential sound source positions within the virtual environment 500).

In some instances, a non-uniform grid of sample points includes fewer sample points than a corresponding uniform grid of sample points for the same virtual environment, leaving room for more data per sample point to account for scene geometry than a single safety distance per sample point.

Figure 5B:
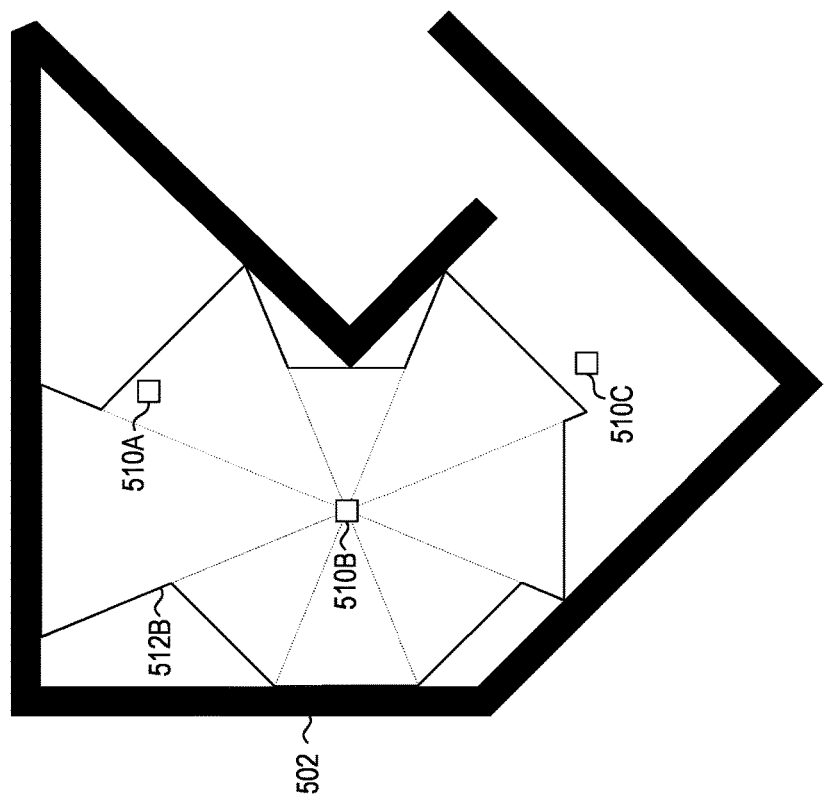
FIGS. 5B and 5C illustrate a conceptual representation of an example safety region defined for a sample point associated with the virtual environment.

FIG. 5B illustrates a conceptual representation of an example safety region 512B defined for sample point 510B associated with the virtual environment 500. A system may determine the safety region 512B for the sample point 510B by extending one or more volumes outward from the sample point 510B (e.g., in three dimensions, covering 4 pi steradians when the volumes are combined). In FIG. 5B, the volumes are represented by dotted triangles extending outward from the sample point 510B. The volumes may take on various forms, such as polyhedral volumes. Each volume may be extended from the sample point 510B along a respective axis (see FIG. 5C, with the axes illustrated in dashed lines). The distance that each volume extends outward from the sample point 510B may be limited by the distance at which the volume intersects with or reaches a virtual object of the virtual environment 500 (e.g., a portion of the walls 502). The combination of the volumes (after their respective extensions outward from the sample point 510B) defines the safety region 512B for the sample point 510B, and the safety region 512B may be stored in association with the sample point 510B.

Figure 5C:
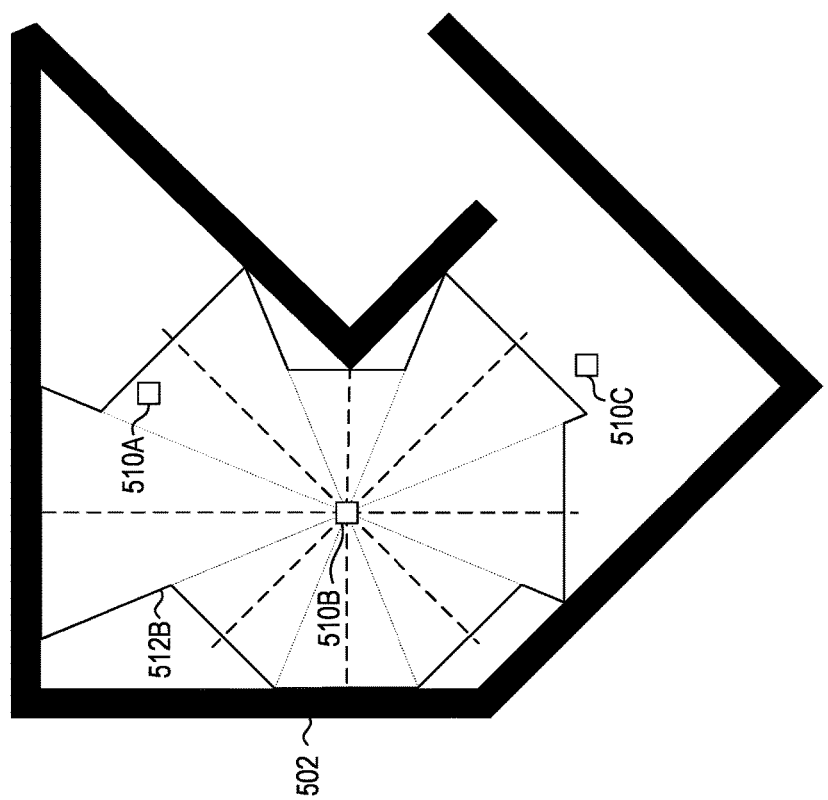

Although FIGS. 5B and 5C illustrate only 8 volumes extended from the sample point 510B to form the safety region 512B, one will appreciate that any number of volumes may be extended from the sample point 510B to form the safety region 512B for the sample point 510B (e.g., 6, 26, 42, 98, or any number).

Additionally, or alternatively, the safety region 512B for the sample point 510B may be defined by extending axes from the sample point 510B (e.g., the broken line axes shown in FIG. 5C) and limiting a distance of each axis to the shorter of: (1) a distance from the sample point 510B to a virtual object (e.g., a portion of the walls 502) of the virtual environment 500 that the axis intersects with or (2) a distance from the sample point 510B to a voxel projection, where the voxel projection is a projection of a voxel of the virtual environment 500 toward the axis, and where the voxel (i) contains at least part of a virtual object of the virtual environment 500 and (ii) is a voxel for which the axis is a nearest axis (of the axes extended from the sample point 510B). The extended axes may then be used to define the safety region 512B for the sample point 510B.

Based upon their respective safety regions, the non-uniform sample points 510A, 510B, and 510C of the virtual environment 500 may be utilized to generate interpolated data for query points within the virtual environment 500. For instance, each respective safety region indicates a space within which its associated sample point is usable for generating interpolated data.

Figure 5D:
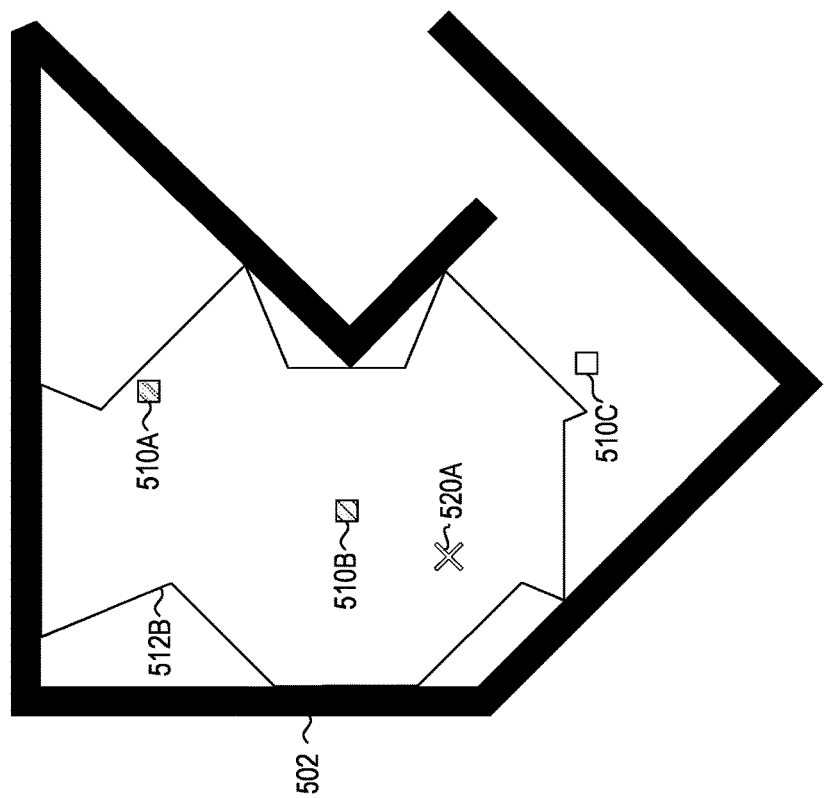
FIG. 5D illustrates a conceptual representation of a query point within the virtual environment for which one or more sample points associated with the virtual environment are usable to generate interpolated data.

FIG. 5D illustrates an example query point 520A within the virtual environment 500, which is contained by the safety region 512B of the sample point 510B. In some implementations, a system determines whether the query point 520A is contained by any safety regions of sample points 510A, 510B, 510C associated with the virtual environment 500 (e.g., beginning with the safety regions of neighboring and/or nearest sample points). In the example of FIG. 5D, the safety region 512B of the sample point 510B contains the query point 520A.

In response to determining that the safety region 512B of the sample point 510B contains the query point 520A, a system may utilize the sample point 510B to generate interpolated data for the query point 520A (e.g., via distance-based interpolation, or other techniques). For instance, in the example of acoustics, the query point 520A may represent the positioning of a listener in the virtual environment 500 at runtime, and acoustic parameters may be desired at runtime for sound propagation from a particular runtime sound source position within the virtual environment 500 toward the listener at the query point 520A. The sample point 510B selected to generate interpolated data for the query point 520A may store a sparse representation of acoustic parameters for sound sources within the virtual environment as perceived by listeners positioned according to the sample point 510B (e.g., in the form of a uniform grid of sample points, each of which may be associated with a safety distance as discussed hereinabove). The system may utilize the acoustic parameters stored by the sample point 510B to obtain interpolated acoustic data/parameters for the particular runtime sound source position and the listener positioned at the query point 520B.

In some instances, a system utilizes multiple sample points of a non-uniform grid to generate interpolated data for a single query point. For instance, for a safety region that contains a query point, a system may utilize other sample points also contained by that safety region to generate interpolated data for the query point. In the example of FIG. 5D, the safety region 512B associated with the sample point 510B contains the sample point 510A. FIG. 5D thus also indicates that the sample point 510A may be used to generate interpolated data for the query point 520A (e.g., by depicting the sample point 510A with a pattern fill).

Figure 5E:
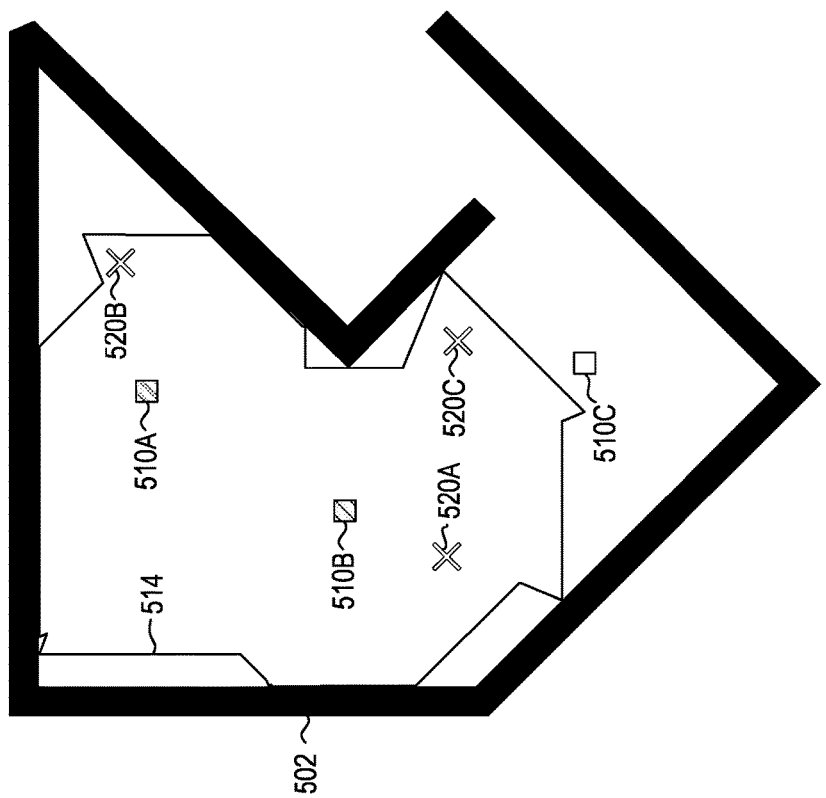
FIG. 5E illustrates a combined safety region for multiple sample points associated with the virtual environment and query points within the combined safety region for which the multiple sample points are usable to generate interpolated data.

In some instances, the safety regions of multiple sample points that are contained by a single safety region can be combined to provide a modified safety region. All sample points whose safety regions contribute to the modified safety region may be used to generate interpolated data for all query points contained by the modified safety region. For instance, FIG. 5E illustrates a modified safety region 514 formed from safety regions associated with sample points 510A and 510B (i.e., safety region 512B). Sample points 510A and 510B may thus be utilized to generate interpolated data for all query points positioned within the modified safety region 514 (e.g., sample points 520A, 520B, and 520C).

Example Method(s)

The following discussion now refers to a number of methods and method acts that may be performed in accordance with the present disclosure. Although the method acts are discussed in a certain order and illustrated in a flow chart as occurring in a particular order, no particular ordering is required unless specifically stated, or required because an act is dependent on another act being completed prior to the act being performed. One will appreciate that certain embodiments of the present disclosure may omit one or more of the acts described herein.

Figure 7:
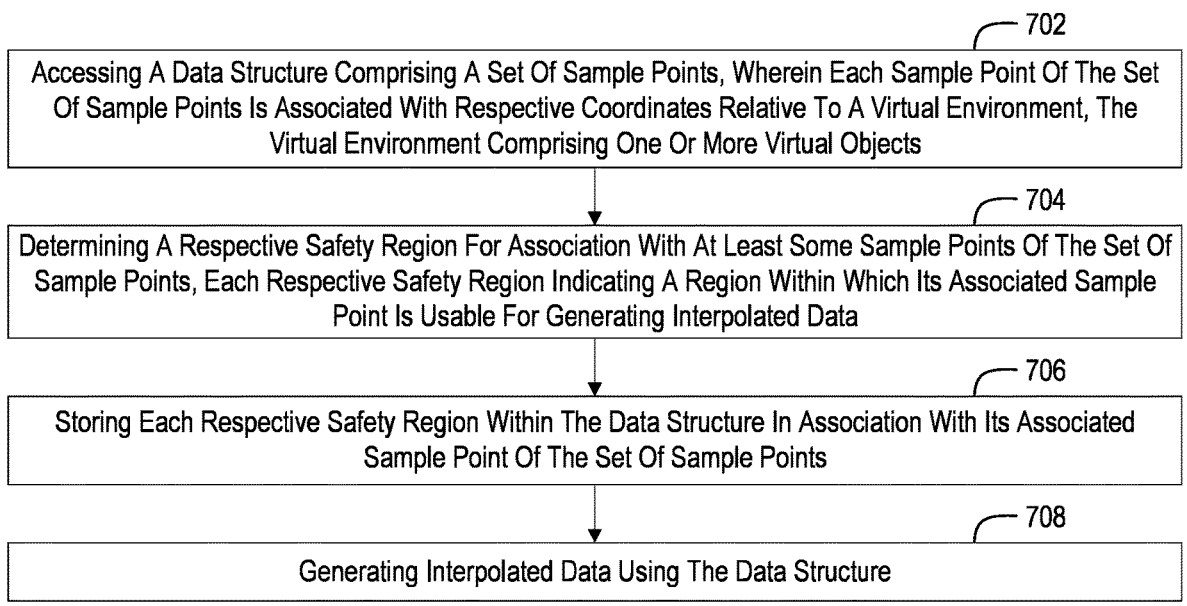

FIGS. 6 and 7 illustrate example flow diagrams 600 and 700, respectively, depicting acts associated with facilitating geometry-aware spatial interpolation.

Act 602 of flow diagram 600 of FIG. 6 includes accessing a data structure comprising a set of sample points, wherein each sample point of the set of sample points is associated with respective coordinates relative to a virtual environment, the virtual environment comprising one or more virtual objects. In some implementations, the respective coordinates of the sample points of the set of sample points are uniformly distributed throughout the virtual environment. In some instances, each sample point of the set of sample points stores environment data for the virtual environment in addition to its respective safety distance.

Act 604 of flow diagram 600 includes determining a respective safety distance for association with at least some sample points of the set of sample points, each respective safety distance representing a distance from its associated sample point of the set of sample points to a nearest virtual object of the virtual environment, each respective safety distance indicating a respective safety region for its associated sample point, each respective safety region indicating a region within which its associated sample point is usable for generating interpolated data. In some implementations, for each respective safety distance and its associated sample point, the nearest virtual object intervenes between the associated sample point and a nearest portion of the virtual environment that is (i) not contained by a virtual object of the virtual environment. In some instances, each respective safety distance represents a distance from its associated sample point toward a midpoint within the nearest virtual object along an axis extending through the associated sample point and the nearest portion of the virtual environment.

Act 606 of flow diagram 600 includes storing each respective safety distance within the data structure in association with its associated sample point of the set of sample points.

Act 608A of flow diagram 600 includes, in response to detecting that respective coordinates of a particular sample point of the set of samples indicate positioning of the particular sample point within a virtual object of the virtual environment, (1) determining whether a single portion of the environment exists that is (i) nearest to the particular sample point and (ii) not contained by a virtual object; and (2) in response to determining that the single portion of the environment exists: (i) measuring a safety distance for the single portion of the environment, and (ii) storing the safety distance within the data structure in association with the particular sample point. In some implementations, act 608A further includes storing environment data associated with the single portion of the environment in association with the particular sample point.

Act 608B of flow diagram 600 includes, in response to detecting that respective coordinates of a particular sample point of the set of samples indicate positioning of the particular sample point within a virtual object of the virtual environment, (1) determining whether a single portion of the environment exists that is (i) nearest to the particular sample point and (ii) not contained by a virtual object; and (2) in response to determining that the single portion of the environment exists: (i) measuring a safety distance for the particular sample point; and (ii) storing the safety distance within the data structure in association with the particular sample point. In some implementations, act 608B further includes storing environment data associated with the single portion of the environment in association with the particular sample point.

Act 610 of flow diagram 600 includes generating interpolated data using the data structure. In some instances, generating interpolated data comprises (i) determining whether a query point is contained by one or more safety regions of the data structure; and (ii) in response to determining that the query point is contained by the one or more safety regions, utilizing one or more sample points associated with the one or more safety regions to generate interpolated data for the query point.

In some implementations, generating interpolated data comprises: (i) determining whether a query point is contained by one or more modified safety regions, the one or more modified safety regions being determined based upon adjacent safety regions associated with adjacent sample points of the data structure; and (ii) in response to determining that the query point is contained by the one or more modified safety regions, utilizing the adjacent sample points to generate interpolated data for the query point. In some instances, the one or more modified safety regions are determined by: (1) identifying the adjacent safety regions of the data structure based upon (i) proximity of the adjacent sample points associated with the adjacent safety regions to the query point and (ii) similarity of environment data of the adjacent sample points; and (2) in response to identifying the adjacent safety regions, defining the one or more modified safety regions to include each of the adjacent safety regions and at least some space that intervenes between the adjacent safety regions.

In some implementations, generating interpolated data comprises, for at least some query points within the virtual environment, utilizing a nearest neighbor interpolation mode, a geometry-unaware interpolation mode, a data-specific heuristics interpolation mode, or a push vector interpolation mode.

Act 702 of flow diagram 700 of FIG. 7 includes accessing a data structure comprising a set of sample points, wherein each sample point of the set of sample points is associated with respective coordinates relative to a virtual environment, the virtual environment comprising one or more virtual objects. In some instances, the respective coordinates of the sample points of the set of sample points are non-uniformly distributed throughout the virtual environment, and each sample point of the set of sample points stores a respective data structure of environment data for the virtual environment.

Act 704 of flow diagram 700 includes determining a respective safety region for association with at least some sample points of the set of sample points, each respective safety region indicating a region within which its associated sample point is usable for generating interpolated data. In some instances, determining a respective safety region for an associated sample point comprises: (i) extending a plurality of volumes from the associated sample point, each of the plurality of volumes being extended from the associated sample point about a respective axis, (ii) limiting a distance of each volume of the plurality of volumes by a distance at which the volume intersects with a virtual object of the virtual environment, and (iii) defining the respective safety region using the plurality of volumes.

In some implementations, determining a respective safety region for an associated sample point comprises (1) extending a plurality of axes from the associated sample point, (2) limiting a distance of each particular axis of the plurality of axes to the shorter of (i) a distance from the associated sample point to a virtual object of the virtual environment that the particular axis intersects with or (ii) a distance from the associated sample point to a voxel projection, where the voxel projection comprises a projection of a voxel of the virtual environment toward the particular axis, and where the voxel (a) contains at least part of a virtual object and (b) is a voxel for which the particular axis is a nearest axis of the plurality of axes; and (iii) defining the respective safety region using the plurality of axes.

Act 706 of flow diagram 700 includes storing each respective safety region within the data structure in association with its associated sample point of the set of sample points.

Act 708 of flow diagram 700 includes generating interpolated data using the data structure. In some instances, generating interpolated data comprises: (i) determining whether a query point is contained by one or more safety regions of the data structure, and (ii) in response to determining that the query point is contained by the one or more safety regions, utilizing one or more sample points associated with the one or more safety regions to generate interpolated data for the query point. In some implementations, generating interpolated data further utilizes one or more additional sample points contained by the one or more safety regions associated with the one or more sample points.

Additional Details Related to Computing Systems

Disclosed embodiments may comprise or utilize a special purpose or general-purpose computer including computer hardware, as discussed in greater detail below. Disclosed embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are one or more "physical computer storage media" or "hardware storage device(s)." Computer-readable media that merely carry computer-executable instructions without storing the computer-executable instructions are "transmission media." Thus, by way of example and not limitation, the current embodiments can comprise at least two distinctly different kinds of computer-readable media: computer storage media and transmission media.

Computer storage media (aka "hardware storage device") are computer-readable hardware storage devices, such as RAM, ROM, EEPROM, CD-ROM, solid state drives ("SSD") that are based on RAM, Flash memory, phase-change memory ("PCM"), or other types of memory, or other optical disk storage, magnetic disk storage or other magnetic storage devices, or any other medium that can be used to store desired program code means in hardware in the form of computer-executable instructions, data, or data structures and that can be accessed by a general-purpose or special-purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links which can be used to carry program code in the form of computer-executable instructions or data structures, and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general-purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Disclosed embodiments may comprise or utilize cloud computing. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAS, pagers, routers, switches, wearable devices, and the like. The invention may also be practiced in distributed system environments where multiple computer systems (e.g., local and remote systems), which are linked through a network (either by hardwired data links, wireless data links, or by a combination of hardwired and wireless data links), perform tasks. In a distributed system environment, program modules may be located in local and/or remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Application-specific Standard Products (ASSPs), System-on-a-chip systems (SOCs), Complex Programmable Logic Devices (CPLDs), central processing units (CPUs), graphics processing units (GPUs), and/or others.

As used herein, the terms "executable module," "executable component," "component," "module," or "engine" can refer to hardware processing units or to software objects, routines, or methods that may be executed on one or more computer systems. The different components, modules, engines, and services described herein may be implemented as objects or processors that execute on one or more computer systems (e.g., as separate threads).

One will also appreciate how any feature or operation disclosed herein may be combined with any one or combination of the other features and operations disclosed herein. Additionally, the content or feature in any one of the figures may be combined or used in connection with any content or feature used in any of the other figures. In this regard, the content disclosed in any one figure is not mutually exclusive and instead may be combinable with the content from any of the other figures.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A system for facilitating geometry-aware spatial interpolation, comprising:
   one or more processors; and
   one or more hardware storage devices that store instructions that are executable by the one or more processors to configure the system to:
      access a data structure comprising a set of sample points, wherein each sample point of the set of sample points is associated with respective coordinates relative to a virtual environment, the virtual environment comprising one or more virtual objects;
      determine a set of respective safety distances, wherein each respective safety distance of the set of respective safety distances is associated with a respective sample point from the set of sample points, wherein, for each particular respective safety distance of the set of respective safety distances:
         the particular respective safety distance is defined using a distance from the respective sample point that is associated with the particular respective safety distance to a nearest virtual object of the virtual environment, and
         the particular respective safety distance indicates a respective safety region for the respective sample point that is associated with the particular respective safety distance, the respective safety region indicating a region within which the respective sample point that is associated with the particular respective safety distance is usable for generating interpolated data; and
      modify the data structure by, for each particular respective safety distance of the set of respective safety distances, storing the particular respective safety distance within the data structure in association with the respective sample point that is associated with the particular respective safety distance, wherein the respective safety distances of the data structure contribute to generation of interpolated data in a manner that accounts for geometry of the one or more virtual objects within the virtual environment.

2. The system of claim 1, wherein the respective coordinates of sample points of the set of sample points are uniformly distributed throughout the virtual environment.

3. The system of claim 1, wherein each respective sample point of the set of sample points stores environment data for the virtual environment.

4. The system of claim 1, wherein, for each particular respective safety distance and the respective sample point that is associated with the particular respective safety distance, the nearest virtual object intervenes between the respective sample point that is associated with the particular respective safety distance and a nearest portion of the virtual environment that is (i) not contained by a virtual object of the virtual environment and (ii) isolated from the associated sample point by a virtual object.

5. The system of claim 4, wherein each particular respective safety distance represents a distance from the respective sample point that is associated with the particular respective safety distance toward a midpoint within the nearest virtual object along an axis extending through the respective sample point that is associated with the particular respective safety distance and the nearest portion of the virtual environment.

6. The system of claim 1, wherein the instructions are executable by the one or more processors to configure the system to, in response to detecting that respective coordinates of a particular sample point of the set of samples indicate positioning of the particular sample point within a virtual object of the virtual environment:
   determine whether a single portion of the virtual environment exists that is (i) nearest to the particular sample point and (ii) not contained by a virtual object; and
   in response to determining that the single portion of the virtual environment exists:
      measure a safety distance for the single portion of the virtual environment; and
      store the safety distance within the data structure in association with the particular sample point.

7. The system of claim 6, wherein the instructions are executable by the one or more processors to configure the system to, in response to determining that the single portion of the virtual environment exists, store environment data associated with the single portion of the virtual environment in association with the particular sample point.

8. The system of claim 1, wherein the instructions are executable by the one or more processors to configure the system to, in response to detecting that respective coordinates of a particular sample point of the set of samples indicate positioning of the particular sample point within a virtual object of the virtual environment:
    determine whether a single portion of the virtual environment exists that is (i) nearest to the particular sample point and (ii) not contained by a virtual object; and
    in response to determining that the single portion of the virtual environment exists:
        measure a safety distance for the particular sample point; and
        store the safety distance within the data structure in association with the particular sample point.

9. The system of claim 8, wherein the instructions are executable by the one or more processors to configure the system to, in response to determining that the single portion of the virtual environment exists, store environment data associated with the single portion of the virtual environment in association with the particular sample point.

10. The system of claim 1, wherein generating interpolated data comprises:
    determining whether a query point is contained by one or more safety regions of the data structure; and
    in response to determining that the query point is contained by the one or more safety regions, utilizing one or more sample points associated with the one or more safety regions to generate interpolated data for the query point.

11. The system of claim 1, wherein generating interpolated data comprises:
    determining whether a query point is contained by one or more modified safety regions, the one or more modified safety regions being determined based upon adjacent safety regions associated with adjacent sample points of the data structure; and
    in response to determining that the query point is contained by the one or more modified safety regions, utilizing the adjacent sample points to generate interpolated data for the query point.

12. The system of claim 11, wherein the one or more modified safety regions are determined by:
    identifying the adjacent safety regions of the data structure based upon (i) proximity of the adjacent sample points associated with the adjacent safety regions to the query point and (ii) similarity of environment data of the adjacent sample points; and
    in response to identifying the adjacent safety regions, defining the one or more modified safety regions to include each of the adjacent safety regions and at least some space that intervenes between the adjacent safety regions.

13. The system of claim 1, wherein generating interpolated data comprises, for at least some query points within the virtual environment, utilizing a nearest neighbor interpolation mode, a geometry-unaware interpolation mode, a data-specific heuristics interpolation mode, or a push vector interpolation mode.

14. A system for facilitating geometry-aware spatial interpolation, comprising:
    one or more processors; and
    one or more hardware storage devices that store instructions that are executable by the one or more processors to configure the system to:
        access a data structure comprising a set of sample points, wherein each sample point of the set of sample points is associated with respective coordinates relative to a virtual environment, the virtual environment comprising one or more virtual objects;
        determine a set of respective safety regions, wherein each respective safety region of the set of respective safety regions is associated with a respective sample point from the set of sample points, wherein, for each particular respective safety region of the set of respective safety regions:
            the particular respective safety region is defined using one or more axes or one or more volumes extended from the respective sample point that is associated with the particular respective safety region, and
            the particular respective safety region indicates a region within which the respective sample point that is associated with the particular respective safety region is usable for generating interpolated data; and
        modify the data structure by, for each particular respective safety region of the set of respective safety regions, storing the particular respective safety region within the data structure in association with the respective sample point that is associated with the particular respective safety region, wherein the safety regions of the data structure contribute to generation of interpolated data in a manner that accounts for geometry of the one or more virtual objects within the virtual environment.

15. The system of claim 14, wherein the respective coordinates of sample points of the set of sample points are non-uniformly distributed throughout the virtual environment, and wherein each sample point of the set of sample points stores a respective data structure of environment data for the virtual environment.

16. The system of claim 14, wherein determining a respective safety region for an associated sample point comprises:
    extending a plurality of axes from the associated sample point;
    limiting a distance of each particular axis of the plurality of axes to the shorter of:
        a distance from the associated sample point to a virtual object of the virtual environment that the particular axis intersects with, or
        a distance from the associated sample point to a voxel projection, wherein the voxel projection comprises a projection of a voxel of the virtual environment toward the particular axis, and wherein the voxel (i) contains at least part of a virtual object and (ii) is a voxel for which the particular axis is a nearest axis of the plurality of axes; and
    defining the respective safety region using the plurality of axes.

17. The system of claim 14, wherein determining a respective safety region for an associated sample point comprises:
    extending a plurality of volumes from the associated sample point, each of the plurality of volumes being extended from the associated sample point about a respective axis;
    limiting a distance of each volume of the plurality of volumes by a distance at which the volume intersects with a virtual object of the virtual environment; and
    defining the respective safety region using the plurality of volumes.

18. The system of claim 14, wherein generating interpolated data comprises:
    determining whether a query point is contained by one or more safety regions of the data structure; and in response to determining that the query point is contained by the one or more safety regions, utilizing one or more sample points associated with the one or more safety regions to generate interpolated data for the query point.

19. The system of claim 18, wherein generating interpolated data further utilizes one or more additional sample points contained by the one or more safety regions associated with the one or more sample points.

20. A method for facilitating geometry-aware spatial interpolation, comprising:
 accessing a data structure comprising a set of sample points, wherein each sample point of the set of sample points is associated with respective coordinates relative to a virtual environment, the virtual environment comprising one or more virtual objects;
 determining a set of respective safety regions, wherein each respective safety region of the set of respective safety regions is associated with a respective sample point from the set of sample points, wherein, for each particular respective safety region of the set of respective safety regions:
  the particular respective safety region is defined using one or more axes or one or more volumes extended from the respective sample point that is associated with the particular respective safety region, and
  the particular respective safety region indicates a region within which the respective sample point that is associated with the particular safety region is usable for generating interpolated data; and
 modify the data structure by, for each particular respective safety region of the set of respective safety regions, storing the particular respective safety region within the data structure in association with the respective sample point that is associated with the particular respective safety region, wherein the safety distances of the data structure contribute to generation of interpolated data in a manner that accounts for geometry of the one or more virtual objects within the virtual environment.

\* \* \* \* \*